C. F. A. GRAY.
PNEUMATIC TIRE.
APPLICATION FILED MAY 12, 1919.
1,396,742.  Patented Nov. 15, 1921.
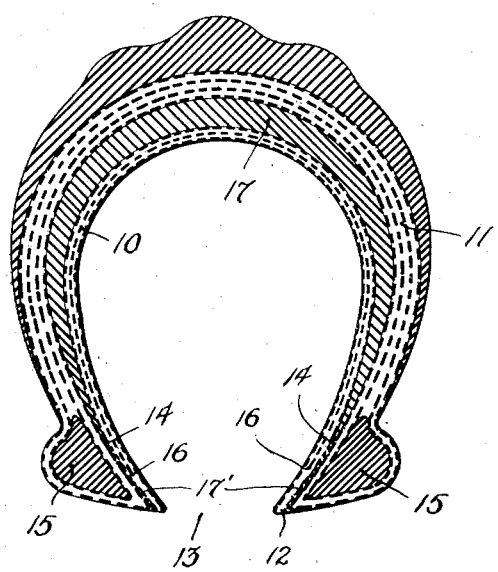
WITNESSES
INVENTOR
C. F. A. Gray
BY
ATTORNEYS

UNITED STATES PATENT OFFICE.

CLARENCE FREDERICK ARTHUR GRAY, OF MONTREAL, CANADA.

PNEUMATIC TIRE.

1,396,742.   Specification of Letters Patent.   Patented Nov. 15, 1921.

Application filed May 12, 1919. Serial No. 296,430.

*To all whom it may concern:*

Be it known that I, CLARENCE F. A. GRAY, a citizen of the Dominion of Canada, and a resident of 46 Richmond Square, Montreal, Canada, have invented a new and Improved Pneumatic Tire, of which the following is a full, clear, and exact description.

This invention relates to improvements in vehicle tires of the pneumatic type and is designed especially for automobiles, motor-trucks, motorcycles, and the ground wheels of aeroplanes, and it has particular reference to that special type of pneumatic tire cover or shoe wherein an inner carcass or casing is located between the air container or inner tube and the outer carcass or casing of the tire and in which the outer carcass is held in place on the wheel rim by beads provided thereon which interlock or engage with the edge flanges of the wheel rim to maintain the tire in position and in which the outer casing is relieved of the greater part of the internal strain or expansive force exerted by the inner air tube when inflated.

Among the objects of this present invention is to provide an improved tire cover or shoe of the type possessing two separate carcasses and an interposed resilient cushion, but designed and constructed in such a manner as to eliminate the disadvantage incident to the possibility of the pinching and hence damaging of the inner tube or air container, without in any manner lessening the functions or effects of the tire in any respect. In the essentials above referred to this invention constitutes an improvement of extreme importance over the construction covered by Letters Patent of the United States No. 1213467 issued to me on the 23rd day of January, 1917.

With the foregoing and other objects in view the invention consists in the arrangement and combination of parts hereinafter described and claimed, and while the invention is not restricted to the exact details of construction disclosed or suggested herein, still for the purpose of illustrating a practical embodiment thereof reference is had to the accompanying drawing in which the figure is a transverse sectional view of the improvement.

It will be noted that the tire comprises an inner carcass 10 and an outer carcass 11. Said inner carcass is designed to support the expansion pressure exerted directly thereupon by the inner air tube (not shown), and for this reason it consists of at least two or more strong layers of woven fabric or of cords, in order to provide the requisite strength to sustain said pressure. In the patent above referred to as the several plies or layers comprising the inner carcass are all extended to the toe 12 or extreme edge of the tire it was found that there is a marked narrowing of the space at 13 between the beads or more correctly between said toes with an accompanying frequent pinching and destruction of the inner air tube, when the latter is inflated. In the present case the layers forming the inner carcass are of graduated or varying lengths. That is to say, if the inner carcass comprises three layers of fabric or cords the outermost layer will terminate at about the point 14 opposite the junction between the outer and middle thirds of the bead 15. The innermost layer will extend to the toe or point 12 of the bead while the middle or intermediate layer will extend to about midway between said points 12 and 14 or as indicated at 16. While I have indicated as a preferred construction of a standard type of tire the relation of the edges or margins of the several plies comprising said inner carcass I wish it to be understood that these several layers may be variously arranged so the various plies will terminate at different points to each other, so that the marginal portions of the inner casing will be tapered.

A cushion 17 of high grade flexible rubber is arranged between the inner carcass 10 and the outer carcass 11. Such cushion having the function of effecting direct resiliency to the tread of the tire even though the inflatable inner tube may be blown up to a high degree of compression. In other words the direct or primary function of the inner carcass is to sustain the inflation force of the inner tube. Under ordinary circumstances the inflation of the inner tube when carried to a high degree renders the tire hard, lifeless, non-responsive to shocks or external impressions, and moreover exceedingly liable to damage due to breakage of the fibers, cuts, or other damaging influences. In my construction however since the inflation of the inner tube is sustained by the inner carcass there is afforded as a result of the cushion 17 a relatively soft, responsive, and durable cushion effect. The cushion 17 is reduced materially in thickness between the bead portion of the inner and outer carcasses so that the margins 17' of the cushions are carried down adjacent to the point 12 as mere films of rubber whereby the design or construction of the cushion margins lends itself to the same circumstance as the narrowing or thinning of the margins of the inner carcass, with respect to the narrowing effect of the bead portions of the structure as a whole.

In the case of the straight-side type of double casing tire construction as distinguished from the beaded type, there is also a like possibility of trouble with the functioning of the inner tube, if the layers should all be extended equally and uniformly to the toe portions. In other words the new features set forth herein lend themselves with like advantages to the straight-side type as well as the clencher type of tire shoes.

While the mass or bulk of the tire body is thus indicated as being materially reduced or lessened at the beaded portions I wish to emphasize the fact that there is no material reduction of efficiency, strength, or durability of the structure in any manner resulting from the improved construction, for among other reasons the inner casing or carcass having a circular shape around the wheel rim cannot be extended at the crown of the tire or enlarged in diameter by reason of the internal pneumatic pressure. Likewise expansion of the free or rim edges laterally is prevented owing to the abutting and union of the same with the margin elements of the outer carcass, said margin or bead elements being restrained from lateral spreading by the flanges of the wheel rims.

In the construction of a tire in accordance with the above mentioned description I wish to be understood that either carcass 10 or 11 may be either of the fabric or corded type irrespective of the construction of the other as may be found most desirable or efficient according to the size, structure, or usage to which it may be subjected.

I claim:

1. A pneumatic tire, comprising an outer casing, an inner casing formed of a plurality of plies of varying lengths, whereby to form tapering ends, and a resilient cushion interposed between the casings and having reduced and tapering ends, the innermost ply of the inner casing and the tapering ends of the cushion terminating at substantially the same point.

2. A pneumatic tire, comprising an inner and outer casing and a resilient cushion between the casings, the tire having a bead, the inner casing being formed of a plurality of plies of varying lengths the innermost one of which extends to the toe of the bead the cushion extending to the toe of the bead and having the portion between the bead and inner casing reduced to a mere film.

3. A pneumatic tire, comprising an inner and outer casing and a resilient cushion between the casings, the tire having a bead, the inner casing being formed of three plies of varying lengths, the innermost ply extending to the toe of the bead and the outermost ply to about one-third of the inner face of the bead, the cushion gradually tapering and extending to the toe of the bead.

CLARENCE FREDERICK ARTHUR GRAY.